United States Patent [19]

Korenaga

[11] 4,250,606
[45] Feb. 17, 1981

[54] METHOD OF PROCESSING ROLL

[75] Inventor: Itsuo Korenaga, Kitakyushu, Japan

[73] Assignee: Hitachi Metals, Ltd., Japan

[21] Appl. No.: 105,621

[22] Filed: Dec. 20, 1979

[30] Foreign Application Priority Data

Dec. 27, 1978 [JP] Japan ................. 53-161356

[51] Int. Cl.³ .................. B29C 17/08; B21K 1/00
[52] U.S. Cl. ....................29/148.5 D; 29/116 AD; 29/404; 264/40.1; 264/162
[58] Field of Search .......... 29/116 AD, 148.4 D, 29/125, 404, 129.5; 264/40.1, 162

[56] References Cited

U.S. PATENT DOCUMENTS

| | | | |
|---|---|---|---|
| 2,544,455 | 3/1951 | Goulding | 29/148.4 D |
| 3,146,568 | 9/1964 | Mayer | 29/125 |
| 3,432,902 | 3/1969 | Rackoff et al. | 29/148.4 D |

Primary Examiner—W. E. Hoag
Attorney, Agent, or Firm—Finnegan, Henderson, Farabow, Garrett & Dunner

[57] ABSTRACT

Method for correcting deflection of a plastic roll under conditions of use. A drilled roll for processing thermoplastic material such as vinyl or the like is deflected during the use due to a thermal distortion to cause a thickness fluctuation in the rolled products. To extinguish this deflection, the roll is corrected by a process having the steps of heating the roll up to the operating temperature, measuring the amount and direction of the deflection of the heated roll, cooling the roll to the room temperature, mechanically imparting to the roll a deflection of the same amount and direction as those observed in the heated roll, and processing the roll by grinding the roll in the mechanically deflected state. After the processing, the roll exhibits an apparent deflection of the same amount in the opposite direction to those exhibited in the heated state, as it is relieved from the mechanical deflecting force. Then, as the roll is heated to the operating temperature before the rolling work, the roll is thermally deflected to negate the apparent deflection so that the rolling is effected by the roll surface having no apparent deflection.

2 Claims, 8 Drawing Figures

METHOD OF PROCESSING ROLL

BACKGROUND OF THE INVENTION

The present invention relates to a method of processing a drilled roll which is used for rolling thermoplastic materials such as vinyl, rubber and the like.

The drilled roll is usually made of a chilled roll material. The outer peripheral part of the drilled roll is constituted by white cast iron while the inner part of the roll is constituted by gray cast iron. A plurality of axial bores are formed in the peripheral portion of the roll under the roll surface at a constant circumferential pitch. These axial bores are communicated with a central bore 2 through radial conduits. In operation, a high temperature heat transfer medium such as hot water is circulated through the central bore, radial conduits and then through the axial bores to heat the roll body up to a temperature of, for example, 100° to 300° C. which is high enough to plasticize the rolled material. During the rolling, the precision of the roll directly affects the precision of the rolled products. It is, therefore, essential to maintain a high precision of the roll during the rolling operation.

The roll, however, often exhibits a deflection when heated to the operating temperature, due to a thermal distortion, even if precisely the roll may be finished at the room temperature. Clearly, this deflection of the roll causes a fluctuation of the thickness of rolled products.

The current demand for reduced thickness and increased hardness of the rolled products goes quite contrary to the fluctuation of thickness.

The deflection of the roll at the operating temperature is an elastic deformation and, therefore, is extinguished as the roll is cooled down to the room temperature. The generation of deflection is attributable to an uneven distribution of the thermal expansion over the cross-section of the roll.

Conventionally, various measures have been taken to prevent the deflection from the view point of quality of the roll. For example, it has been attempted to uniformalize as much as possible the thickness of the peripheral layer of white cast iron, as well as the extent of the graphitization of the gray cast iron constituting the inner part of the roll. All of these measures, however, are not satisfactory.

Measures have been taken also from the view point of roll operation. For instance, it has been proposed to synchronize the rotations of the upper and lower rolls in such a manner as to negate the deflections of these rolls. It has been attempted also to reduce the absolute value of deflection by imparting an eccentricity to the bearings. These measures are also unsatisfactory to sufficiently suppress the thickness fluctuation of the products.

As a fundamental measure, it has been proposed to finish the roll by machining while maintaining the roll at the high operating temperature. This solution, however, involves various problems such as difficulty in the temperature control, difficulty in maintaining the precision of the machine tool at the elevated temperature, unknown factor of reduction of strength of the grinding wheel at the elevated temperature and so forth. For these reasons, this solution cannot be put into practical use.

SUMMARY OF THE INVENTION

It is, therefore, a major object of the invention to overcome the above described problems of the prior art, by providing a novel method of processing a drilled roll which can eliminate the roll deflection at the high operating temperature.

To this end, according to the invention, there is provided a method of processing a drilled roll comprising the steps of placing a tie bolt in one of the axial bores formed in the peripheral portion of the roll, tightening the tie bolt to impart an axial compression force to the portions of the roll end surface where said tie bolt is positioned to give an artificial or intentional deflection to the roll, processing the deflected roll into a cylindrical form and then removing the bolt to release the processed roll.

The above and other objects as well as advantageous features of the invention will become more apparent from the following description of the preferred embodiment taken in conjunction with the accompanying drawings.

DESCRIPTION OF THE PREFERRED EMBODIMENTS

Figure 1:
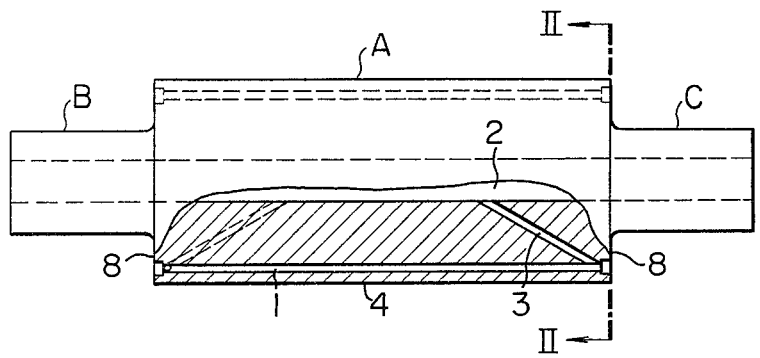
FIG. 1 is a partly sectioned side elevational view of a drilled roll to be processed by the method of the invention.
Figure 2:
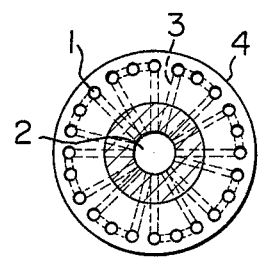
FIG. 2 is a sectional view taken along the line II—II of FIG. 1.

Before turning to the description of the roll processing method of the invention, a description will be made as to the construction of the drilled roll for an easier understanding of the invention, with specific reference to FIGS. 1 and 2.

A typical drilled roll for rolling thermoplastic materials such as vinyl, rubber and the like has a roll body A. From both axial ends of the roll body A, projected in the axial direction are journals B, C adapted to be rotatably carried by bearings. As will be clearly seen from FIG. 2, the roll body has a plurality of axial bores 1 formed in the peripheral portion thereof and disposed at a constant circumferential pitch. These axial bores are communicated through radial inclined conduits 3 with a central bore 2 which extends through the roll body A and the journals B, C. In operation, a high-temperature heat transfer medium such as hot water is circulated through the central bore 2, radial conduits 3 and then through the axial bores 1 to heat the roll surface up to a temperature of, for example, 100° to 300° C. which is high enough to plasticize the material to be rolled. As stated before, the roll is undesirably deflected as it is heated to the operating temperature, to cause a thickness fluctuation of the rolled products. This deflection of the roll could not be satisfactorily overcome by the heretofore proposed countermeasures.

This problem, however, is fairly overcome by the method of the invention, as will be fully understood from the following description.

Figure 3A:
FIGS. 3A to 3F are illustrations of steps of the roll processing method in accordance with the invention.
Figure 3B:
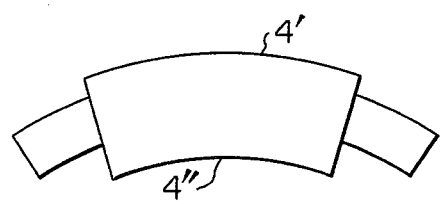

Referring to FIGS. 3A to 3F schematically showing the steps of the roll processing method of the invention, the roll after a machining at room temperature is shown in FIG. 3A. This roll will exhibit a deflection as shown in FIG. 3B, when heated to the operating temperature.

Figure 3C:
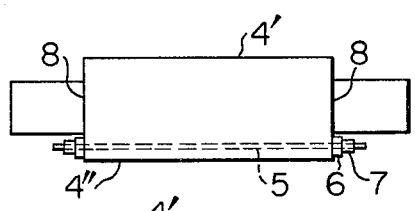

The amount or the amplitude of the roll deflection observed when the roll is supported at the journal portions is 40 μm or so at the greatest. Thus, in FIG. 3B, as well as in other Figures, the state of deflection is shown in an exaggerated manner. The amount of deflection at each point on the roll, as well as the direction of the deflection, are measured and recorded in this state. Then, as the roll is cooled down to the room temperature, the roll resumes the original state as shown in FIG. 3C.

Figure 3D:
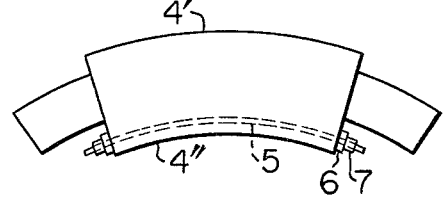

Then, a tie bolt 5 is inserted into one of the axial bores 1 closest to the roll side 4" which is concaved when the roll is in the heated condition. Subsequently, washers 6 and nuts 7 are fitted to both ends of the tie bolt 5 projecting both axial ends of the roll. As the nuts 7 are screwed to tighten the tie bolt 5, an axial compression is imparted to the axial end surfaces of the roll to compress the latter. In consequence, the roll is deflected as shown in FIG. 3D such that the roll side 4" is concaved while the roll side 4' is convexed. The tightening torque exerted on the nuts 7 is so selected that the amount of deflection caused by the compression is substantially equal to that observed when the roll is in the heated condition.

Then, a correction grinding is effected on the roll in the deflected state by means of a grinding machine, until the deflection over the entire length of the roll including the journal portions is completely extinguished.

Figure 3E:
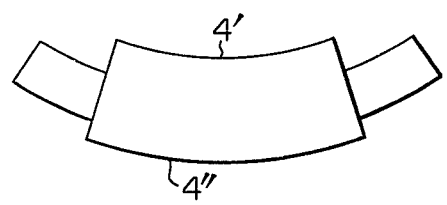
Figure 3F:
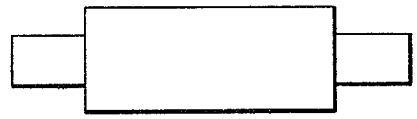

Then, as the roll is relieved from the mechanical compression force by the removal of the tie bolt 5, the roll is freed to take a posture as shown in FIG. 3E. In this state, such an apparent deflection is observed that the roll is convexed at its one side 4" which is concaved in the heated roll and concaved at the other side 4' which is convexed in the heated roll.

In consequence, as the roll is heated up to the operating temperature to commence the rolling, a thermal distortion is generated to deny or compensate for the apparent deflection shown in FIG. 3E, so that the roll takes a form as shown in FIG. 3D having no apparent deflection. It will be seen that, since the rolling is made with this roll having no apparent deflection, the undesirable thickness fluctuation is fairly avoided and the aforementioned problems of the prior arts are fairly overcome.

EXAMPLE

The roll processing method of the invention was applied to the correction of a drilled roll having a roll body diameter of 610 mm, roll body length of 1830 mm and overall length of 3530 mm. Before, the correction by the method of the invention, the roll exhibited a maximum deflection amount of 30 μm at both journal portions.

After cooling the roll to the room temperature, an M24 bolt was inserted in each of five axial bores of the portion of roll which is concaved in the heated state of the roll. Then, nuts are screwed to both ends of each tie bolt to compress the roll in the axial direction through the medium of the washers. The tightening torque was 17 Kg.m for the central three tie bolts and 15 Kg.m for the two outer tie bolts. As a result of the compression, the roll resumed a deflected condition to exhibit the same deflection amount of 30 μm as in the case of the heated state.

After effecting a correction grinding in this state, five tie bolts were removed to relieve the roll from the compression. In consequence, the roll exhibited a deflection of 30 μm in the opposite direction.

The roll, however, showed an even state having no deflection, when heated up to the operating temperature, and the rolling work was executed successfully without substantial thickness fluctuation of the rolled products.

As has been described, according to the invention, there is provided a practical and effective method for avoiding various troubles in rolling attributable to the roll deflection. Consequently, the rolling precision and rolling efficiency are greatly improved in the rolling of thermoplastic materials such as vinyl and rubber.

What is claimed is:

1. A method of processing a roll having a plurality of axial bores in its peripheral portion: comprising the steps of: heating said roll up to operating temperature; measuring the amount of deflection and the direction of deflection; cooling said roll to the room temperature; mechanically imparting to said roll a deflection of the same amount and direction as those measured with the heated roll; and then processing the roll in the deflected state into a true cylindrical form.

2. A method of processing a roll as claimed in claim 1, wherein said deflection mechanically imparted to the roll is generated by inserting a tie bolt into at least one of said axial bores in the portion of the roll which is concaved in the heated state of said roll and then tightening said tie bolt to axially compress said roll.

* * * * *